(12) United States Patent
Aldworth et al.

(10) Patent No.: US 7,802,040 B2
(45) Date of Patent: Sep. 21, 2010

(54) ARBITRATION METHOD REORDERING TRANSACTIONS TO ENSURE QUALITY OF SERVICE SPECIFIED BY EACH TRANSACTION

(75) Inventors: Peter James Aldworth, Cambridge (GB); Andrew Benson, Sheffield (GB); Daren Croxford, Cambridgeshire (GB)

(73) Assignee: ARM Limited, Cambridge (GB)

( * ) Notice: Subject to any disclaimer, the term of this patent is extended or adjusted under 35 U.S.C. 154(b) by 96 days.

(21) Appl. No.: 12/086,244

(22) PCT Filed: Dec. 22, 2005

(86) PCT No.: PCT/GB2005/005030

§ 371 (c)(1),
(2), (4) Date: Jun. 9, 2008

(87) PCT Pub. No.: WO2007/071889

PCT Pub. Date: Jun. 28, 2007

(65) Prior Publication Data

US 2009/0287865 A1    Nov. 19, 2009

(51) Int. Cl.
*G06F 13/362* (2006.01)
*G06F 13/372* (2006.01)
*G06F 13/34* (2006.01)

(52) U.S. Cl. .............. 710/118; 710/110; 710/125; 710/244

(58) Field of Classification Search ........... 710/110
See application file for complete search history.

(56) References Cited

U.S. PATENT DOCUMENTS 5,802,330 A    9/1998    Dutton

| 7,231,475 B1 * | 6/2007 | Single et al. ............ 710/117 |
| 7,249,210 B2 * | 7/2007 | Ganasan et al. ......... 710/117 |
| 7,366,818 B2 * | 4/2008 | Radulescu et al. ....... 710/316 |

(Continued)

OTHER PUBLICATIONS

International Search Report for PCT/GB2005/005030 mailed Aug. 29, 2006.

(Continued)

*Primary Examiner*—Ryan M Stiglic
(74) *Attorney, Agent, or Firm*—Nixon & Vanderhye P.C.

(57) ABSTRACT

A method, an interconnect and a system for processing data is disclosed. The method comprises the steps of: a) receiving a request to perform a data transaction between a master unit and a slave unit, b) receiving an indication of a quality of service requirement associated with said data transaction; c) determining an interconnect quality of service level achievable when transmitting said data transaction over the interconnect logic having regard to any other pending data transactions which are yet to be issued; d) determining a slave quality of service level achievable when responding to said data transaction once received by said slave unit from said interconnect logic; and e) determining whether the combined interconnect quality of service level and the slave quality of service level fails to achieve the quality of service requirement and, if so, reordering the pending data transactions to enable the quality of service requirement of each data transaction to be achieved. Hence, arbitration between data transactions occurs prior to those transactions being provided to the interconnect. It will be appreciated that this enables pending data transactions to be systematically reordered and the quality of service level for each of these reordered data transactions to be accurately calculated to ensure that the quality of service requirement for each of those data transactions is achieved. Accordingly, this enables all aspects of quality of service to be budgeted together and true end-to-end quality of service may be determined for each data transaction.

47 Claims, 6 Drawing Sheets

U.S. PATENT DOCUMENTS

| | | | |
|---|---|---|---|
| 7,373,449 B2 * | 5/2008 | Radulescu et al. | 710/316 |
| 7,426,709 B1 * | 9/2008 | Ganesan | 716/16 |
| 2002/0188809 A1 | 12/2002 | Kershaw | |
| 2003/0074507 A1 | 4/2003 | Weber | |
| 2004/0210695 A1 | 10/2004 | Weber et al. | |
| 2005/0138252 A1 * | 6/2005 | Gwilt | 710/110 |
| 2005/0281279 A1 * | 12/2005 | Dennison et al. | 370/412 |
| 2006/0041889 A1 * | 2/2006 | Radulescu et al. | 719/313 |
| 2006/0149874 A1 * | 7/2006 | Ganasan et al. | 710/110 |
| 2006/0200607 A1 * | 9/2006 | Subramaniam Ganasan et al. | 710/113 |
| 2007/0038792 A1 * | 2/2007 | Shin | 710/240 |
| 2008/0147944 A1 * | 6/2008 | Sonntag et al. | 710/240 |
| 2008/0256270 A1 * | 10/2008 | Hubbs et al. | 710/38 |
| 2009/0043934 A1 * | 2/2009 | Bjerregaard | 710/244 |

OTHER PUBLICATIONS

Written Opinion for PCT/GB2005/005030 mailed Aug. 29, 2006.
International Preliminary Report on Patentability mailed Jul. 3, 2008 in corresponding PCT/GB2005/005030.

* cited by examiner

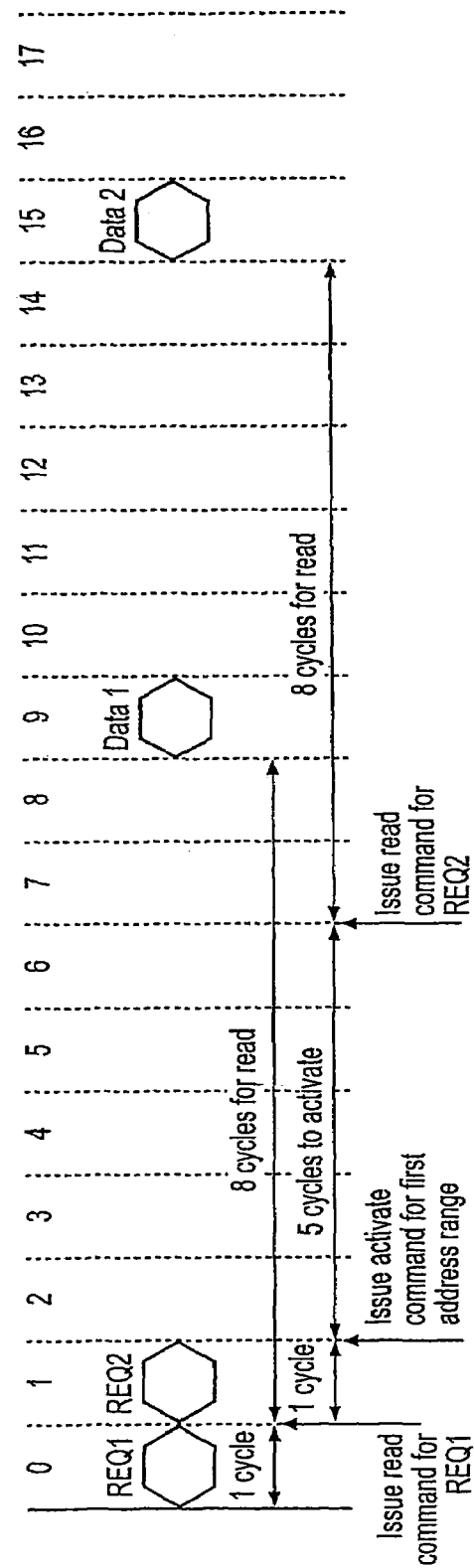
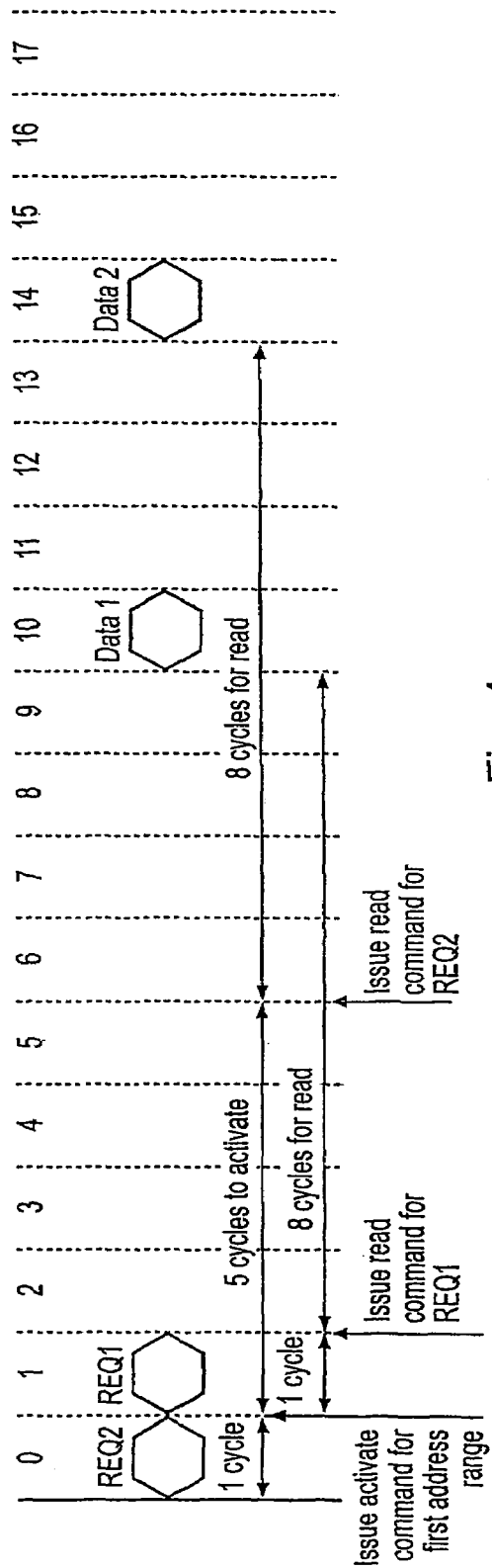
Fig. 3
Fig. 4

ARBITRATION METHOD REORDERING TRANSACTIONS TO ENSURE QUALITY OF SERVICE SPECIFIED BY EACH TRANSACTION

This application is the U.S. national phase of International Application No. PCT/GB2005/005030 filed 22 Dec. 2005 which designated the U.S., the entire contents of each of which are hereby incorporated by reference.

FIELD OF THE INVENTION

The present invention relates to an interconnect, a method and a system for processing data.

BACKGROUND OF THE INVENTION

Interconnects are known. Typically, interconnects are used to couple one or more master units with one or more slave units. When a data transaction is to occur between a master unit and a slave unit the interconnect may be configured to couple the two units together. Once coupled, the data transaction can then occur.

The connectivity within the interconnect may be limited such that only a predetermined number of masters may be coupled with a predetermined number of slaves at any one time. It will be appreciated that this provides a finite limit on the throughput of the interconnect which can restrict the ability of the interconnect to respond to each data transaction.

It is desired to provide an improved interconnect.

SUMMARY OF THE INVENTION

According to a first aspect, the present invention provides a method of ordering data transactions between a plurality of master units and a plurality of slave units using interconnect logic which couples a master logic unit with a slave logic unit to enable each data transaction to occur, said method comprising the steps of: a) receiving a request to perform a data transaction between a master unit and a slave unit, b) receiving an indication of a quality of service requirement associated with said data transaction; c) determining an interconnect quality of service level achievable when transmitting said data transaction over the interconnect logic having regard to any other pending data transactions which are yet to be issued; d) determining a slave quality of service level achievable when responding to said data transaction once received by said slave unit from said interconnect logic; and e) determining whether the combined interconnect quality of service level and the slave quality of service level fails to achieve the quality of service requirement and, if so, reordering the pending data transactions to enable the quality of service requirement of each data transaction to be achieved.

The present invention recognises that it is acceptable for some data transactions to achieve a relatively higher quality of service level, whereas it is may be acceptable for other data transactions to be provided with a relatively lower quality of service level.

The present invention also recognises that whilst in some prior art approaches the interconnect can be arranged to transmit higher quality of service data transactions across the interconnect in favour of lower quality of service data transactions, any end-to-end quality of service requirement still can not necessarily be guaranteed since the interconnect has no knowledge of the quality of service level achievable by the destination slave unit in response to the data transaction. Similarly, whilst the slave units can be arranged to respond to higher quality of service data transaction requests in favour of lower quality of service requests, again any end-to-end quality of service requirement can not necessarily be guaranteed since the slave unit has no knowledge of the quality of service level achievable by the interconnect.

The present invention also recognises that interconnect and slave units are generally separate items and their implementation is generally restricted by standard interface protocols which do not typically support communication of quality of service information between the interconnect and slave unit. This restricts the ability to provide a generic interconnect, using standard interfaces, which can interface between master and slave units and which can achieve a requested end-to-end quality of service for any data transaction, at any time. Whilst this may not necessarily be an issue when the slave units and interconnect are lightly loaded, as the slave units and the interconnect becomes more heavily loaded, end-to-end quality of service levels can decrease to unacceptable levels.

Accordingly, an indication is provided which indicates a quality of service requirement associated with that data transaction. The status of the interconnect and the slave unit is determined by reviewing the likely quality of service level provided by the interconnect and the slave unit when responding to that data transaction. If it is determined that the likely quality of service level achievable will fail to meet the quality of service requirement then the ordering of that data transaction and any other pending data transactions is changed until it is determined that each data transaction will complete, achieving its quality of service requirement.

Hence, arbitration between data transactions occurs prior to those transactions being provided to the interconnect. It is assumed that once the data transaction has been issued to the interconnect, that data transaction will likely achieve the anticipated quality of service level. This is because the quality of service provided by the interconnect will be known, as will the quality of service of the slave unit for that data transaction, prior to the data transaction even being issued to the interconnect. It will be appreciated that this enables pending data transactions to be systematically reordered and the quality of service level for each of these reordered data transactions to be accurately calculated to ensure that the quality of service requirement for each of those data transactions is achieved. Accordingly, this enables all aspects of quality of service to be budgeted together and true end-to-end quality of service may be determined for each data transaction.

In embodiments, at least one of said plurality of slave units has a constant predetermined slave quality of service level for all data transactions associated with that slave unit.

Accordingly, some slave units will achieve the same quality of service level, irrespective of the nature of the data transaction being serviced. It will be appreciated that, in some circumstances, all the slave units may achieve a constant quality of service level. Also, for some slave units where determining an exact quality of service level may be difficult to achieve, it will be appreciated that it may be desirable to assume a constant, but most pessimistic, quality of service level for that slave unit.

In embodiments, at least one of said plurality of slave units has a predetermined slave quality of service level which differs for different data transactions associated with that slave unit.

Accordingly, the slave unit may achieve a different quality of service level for each different data transaction.

In embodiments, said interconnect quality of service level is determined in dependence on the utilisation of the interconnect logic.

Accordingly, the quality of service level may be determined based on the current utilisation of interconnect resources, its bandwidth and the capacity of the interconnect in view of any outstanding transactions.

In embodiments, said interconnect quality of service level is determined in dependence on a status or configuration of the interconnect resources.

In embodiments, said slave quality of service level is determined in dependence on a status or configuration of that slave unit.

In embodiments, said slave quality of service level is determined having regard to any other pending data transactions which are yet to be issued.

In embodiments, said step of reordering comprises elevating the data transaction which fails to meet its quality of service requirement by the greatest amount to an earlier position in said pending data transactions.

In this way, the data transaction least likely to achieve its quality of service requirement is dealt with earlier, thereby increasing the likelihood that the quality of service requirement will be achieved.

In embodiments, said indication of a quality of service requirement associated with said data transaction is provided with said data transaction.

In embodiments, said indication of a quality of service requirement associated with said data transaction is determined based on a predetermined quality of service requirement of the master unit which initiated said data transaction.

Accordingly, the quality of service requirement for any data transaction may vary dynamically with each data transaction or, alternatively, may be based on a preset, constant quality of service requirement associated with the master unit which generated that data transaction.

In embodiments, said indication of a quality of service requirement comprises an indication of a transaction latency period within which the data transaction is to complete, said interconnect quality of service level comprises an indication of an interconnect latency period incurred when transmitting the data transaction over the interconnect logic having regard to any other pending data transactions which are yet to be issued, said slave quality of service level comprises a slave latency period incurred when responding to the data transaction once received by the slave unit from the interconnect logic, and said step (e) comprises determining whether the combined interconnect latency period and slave latency period exceeds the transaction latency period and, if so, reordering the pending data transactions to enable the combined interconnect latency period of each data transaction to be achieved.

Hence, it may be acceptable for some data transactions to complete with a relatively short transaction latency period, whereas it is may be acceptable for other data transactions to complete with a longer transaction latency period.

Accordingly, whilst in some prior art approaches the interconnect can be arranged to transmit higher priority data transactions across the interconnect in favour of lower priority data transactions, any end-to-end latency period cannot be guaranteed since the interconnect has no knowledge of how quickly the destination slave unit will respond to the data transaction. Similarly, whilst the slave units can be arranged to respond to higher priority data transaction requests in favour of lower priority requests, again the any end-to-end latency period cannot be guaranteed since the slave unit has no knowledge of any latency period which will be introduced by the interconnect.

Also, as mentioned previously, the interconnect and slave units are generally separate items and their implementation is generally restricted by standard interface protocols which do not typically support communication of scheduling information between the interconnect and slave unit. This restricts the ability to provide a generic interconnect, using standard interfaces, which can interface between master and slave units and which can achieve a requested end-to-end quality of service for any data transaction, at any time. Whilst this may not necessarily be an issue when the slave units and interconnect are lightly loaded, as the slave units and the interconnect becomes more heavily loaded, end-to-end latency periods can increase to unacceptable levels.

Accordingly, an indication is provided with indicating maximum transaction latency period within which that data transaction will need to complete. The status of the interconnect and the slave unit is determined by reviewing the likely latency period of the interconnect and the slave unit when responding to that data transaction. If it is determined that the likely latency period will exceed the maximum transaction latency period then the ordering of that data transaction and any other pending data transactions is changed until it is determined that each data transaction will complete within its maximum allowable transaction latency period.

Hence, arbitration between data transactions occurs prior to those transactions being provided to the interconnect. It is assumed that once the data transaction has been issued to the interconnect, that data transaction is more likely than not to complete as expected. This is because the latency of the interconnect will be known, as will the latency of the slave unit for that data transaction, prior to the data transaction even being issued to the interconnect. It will be appreciated that this enables pending data transactions to be systematically reordered and the latency for each of these reordered data transactions to be accurately calculated to ensure that the allowable latency period for each of those data transactions is not exceeded. Accordingly, this enables all aspects of latency to be budgeted together and true end-to-end latency may be determined for each data transaction.

In embodiments, at least one of the plurality of slave units has a constant predetermined slave latency period for all data transactions associated with that slave unit.

Accordingly, some slave units will exhibit the same slave latency period, irrespective of the nature of the data transaction being serviced. It will be appreciated that, in some circumstances, all the slave units may achieve a constant slave latency period. Also, for some slave units where determining an exact slave latency period may be difficult to achieve, it will be appreciated that it may be desirable to assume a constant, but most pessimistic, slave latency period for that slave unit.

In embodiments, at least one of the plurality of slave units has a predetermined slave latency period which differs for different data transactions associated with that slave unit.

Accordingly, the slave unit may achieve a different slave latency period for each different data transaction.

In embodiments, at least one of the plurality of slave units has a first predetermined slave latency period for data transactions associated with that slave unit falling within a set of first address ranges and a second predetermined slave latency period for all other data transactions associated with that slave unit.

Accordingly, for some slave units, any data transaction associated with one set of address ranges will exhibit one slave latency period, whereas data transactions associated any other address range will exhibit a different slave latency period.

In embodiments, at least one of the plurality of slave units comprises a SDRAM having a first predetermined slave latency period for data transactions associated with active memory regions of the SDRAM and a second predetermined slave latency period for data transactions associated with inactive memory regions of the SDRAM.

Accordingly, the slave latency period will vary dependent upon whether the memory region which is the subject of the data transaction is active or not.

In embodiments, the step of reordering comprises grouping together any of the pending data transactions associated with active memory regions.

In this way, data transactions associated with the same memory region may be issued together which will generally improve the performance of the slave unit when responding to those data transactions and improve the slave latency period.

In embodiments, the interconnect logic is operable to support a predetermined number of data transactions at any one time.

Accordingly, the interconnect may be operable to support one or more data transactions in any one cycle. It will be appreciated that the number of data transactions supportable may vary dependent upon the resources and bandwidth available the interconnect, and its current configuration.

In embodiments, the interconnect latency period is determined in dependence on the current utilisation of interconnect resources and the total capacity of the interconnect in terms of multiple outstanding transactions and bandwidth.

In embodiments, the step of reordering comprises elevating the data transaction which fails to meet its transaction latency period by the greatest amount to an earlier position in the pending data transactions.

By reordering the data transactions such that the data transaction least likely to achieve the transaction latency period is issued earlier, the likelihood that the transaction latency period will be achieved is increased.

In embodiments, the indication of a quality of service requirement comprises an indication of a bandwidth required to support that transaction, the interconnect quality of service level comprises an interconnect bandwidth utilised when transmitting the data transaction over the interconnect logic having regard to any other pending data transactions which are yet to be issued, the slave quality of service level comprises a slave bandwidth utilised when responding to the data transaction once received by the slave unit from the interconnect logic; and the step (e) comprises determining whether either the interconnect bandwidth or the slave bandwidth fails to support the bandwidth required, if so, reordering the pending data transactions to support the bandwidth required.

In embodiments, the indication of a quality of service requirement comprises an indication of a minimum bandwidth required to support that transaction, the interconnect quality of service level comprises an interconnect bandwidth utilised when transmitting the data transaction over the interconnect logic having regard to any other pending data transactions which are yet to be issued, the slave quality of service level comprises a slave bandwidth utilised when responding to the data transaction once received by the slave unit from the interconnect logic; and the step (e) comprises determining whether either the interconnect bandwidth or slave bandwidth fails to achieve the minimum bandwidth required, if so, reordering the pending data transactions to support the minimum bandwidth required.

In embodiments, the method further comprising the step of: f) in the event the reordered pending data transactions achieve the quality of service requirement, reordering the pending data transactions to improve transaction efficiency.

Hence, even when the required quality of service level is achieved, it is recognised that it may be possible to further improve the efficiency of accesses to, for example, an SDRAM because the chosen transaction order, even though it meets the quality of service level, may continually activate and close address regions in the same bank. This inefficiency may be acceptable for a quality of service perspective but it may result in unnecessarily high power consumption. By further reordering the pending data transactions, both quality of service and efficiency can be considered. These efficiency considerations may be programmed into a quality of service arbiter as efficiency of service requirements having lower priority than any quality of service requirements. The efficiency of service requirements may then prompt the quality of service arbiter to re-order transactions to improve efficiency provided that no quality of service requirements are violated.

In embodiments, the step of reordering comprises splitting at least one pending data transaction into a plurality of sub-transactions and reordering the pending data transactions and sub-transactions to meet quality of service requirements.

It is recognised that each master may issue transaction requests comprising long bursts of data. The quality of service arbiter may split up these long bursts into 'sub-transactions' that could then be interleaved with transactions from another master. This helps to reduce the access latencies for other masters (so that they can issue transactions during a long burst from another master). The quality of service arbiter is typically best placed to make these sorts of decisions as it may be a balance between one master's quality of service latency requirement (helped by splitting other masters bursts) and another master's quality of service minimum bandwidth requirements (helped by keeping its bursts together).

According to a second aspect, the present invention provides an interconnect operable to couple a plurality of master logic units with a plurality of slave logic units to enable data transactions between a master logic unit and a slave logic unit to occur, the interconnect comprising: reception logic operable to receive a request to perform a data transaction between a master unit and a slave unit, each request having an indication of a quality of service requirement associated with the data transaction; interconnect quality of service determination logic operable to determine an interconnect quality of service level achievable when transmitting the data transaction over the interconnect logic having regard to any other pending data transactions which are yet to be issued; slave quality of service determination logic operable to determine a slave quality of service level achievable when responding to the data transaction once received by the slave unit from the interconnect logic; and arbitration logic operable to determine whether the combined interconnect quality of service level and the slave quality of service level fails to achieve the quality of service requirement and, if so, to reorder the pending data transactions to enable the quality of service requirement of each data transaction to be achieved.

According to a third aspect, the present invention provides a system for processing data, comprising: a plurality of master units; a plurality of slave units; and interconnect means for coupling the plurality of master logic units with the plurality of slave logic units to enable data transactions between a master logic unit and a slave logic unit to occur, the interconnect comprising: reception means for receiving a request to perform a data transaction between a master unit and a slave unit, each request having an indication of a quality of service requirement associated with the data transaction; interconnect quality of service determination means for determining an interconnect quality of service level achievable when transmitting the data transaction over the interconnect logic having regard to any other pending data transactions which are yet to be issued; slave quality of service determination means for determining a slave quality of service level achievable when responding to the data transaction once received by the slave unit from the interconnect logic; and arbitration means for determining whether the combined interconnect quality of service level and the slave quality of service level fails to achieve the quality of service requirement and, if so, to reorder the pending data transactions to enable the quality of service requirement of each data transaction to be achieved.

BRIEF DESCRIPTION OF THE DRAWINGS

FIG. 3 illustrates an analysis performed by the quality of service arbiter for one ordering of data transaction requests received;

FIG. 4 is a timing diagram illustrating the timing of the data transactions for another ordering;

DESCRIPTION OF THE EMBODIMENTS

Figure 1:
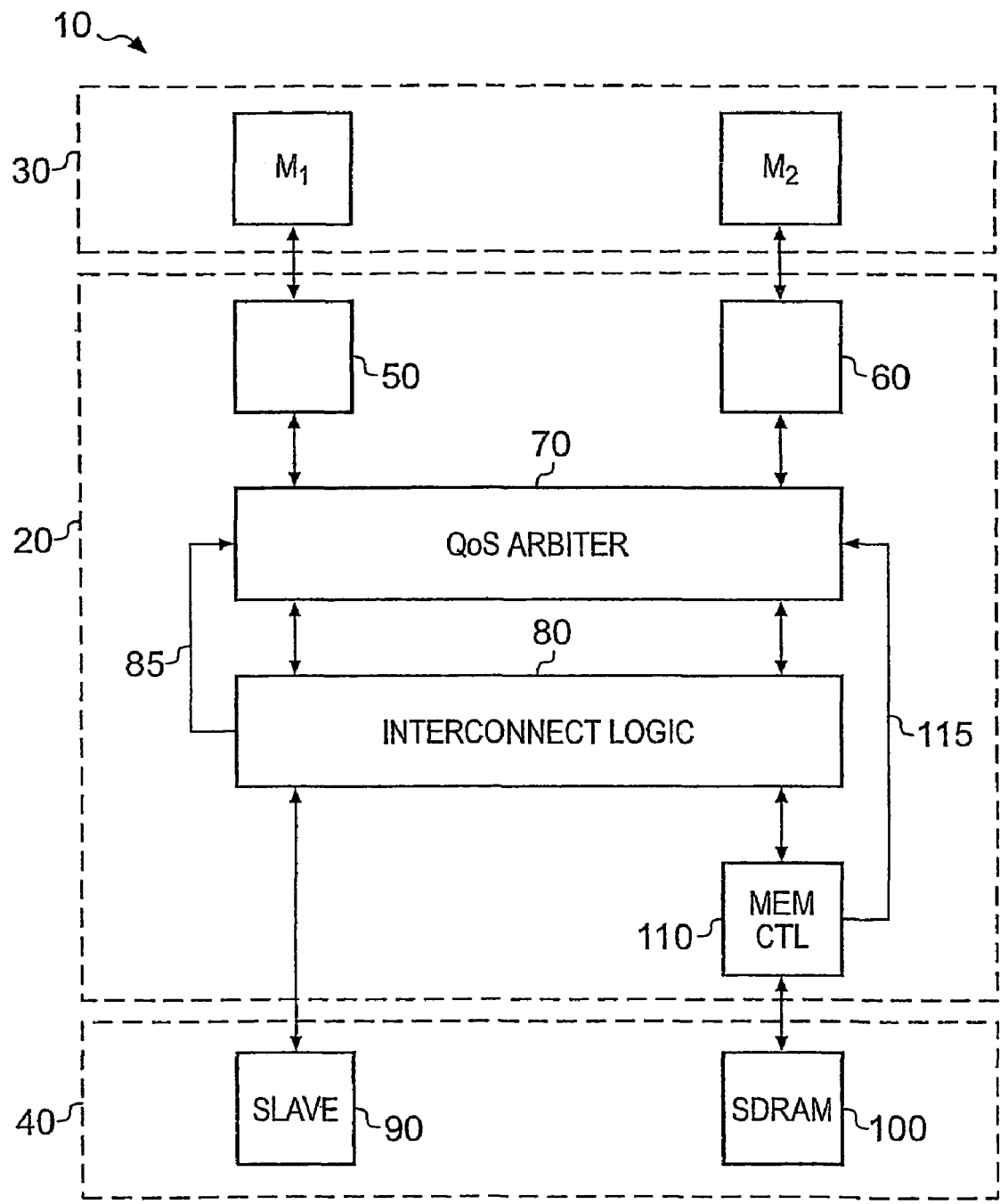
FIG. 1 illustrates a data processing system incorporating an interconnect according to an embodiment of the present invention.

FIG. 1 illustrates a data processing apparatus, generally 10, incorporating an interconnect 20 according to an embodiment of the present invention. The interconnect 20 couples a plurality of master units, generally 30, with a plurality of slave units, generally 40. In this example, a first master unit $M_1$ and a second master unit $M_2$ are provided. However, it will be appreciated that more than two master units and/or more than two slave units may be provided.

The interconnect 20 comprises a number of ports 50, 60, a quality of service arbiter 70, interconnect logic 80 and a memory controller 110. Coupled with each of the master units $M_1$, $M_2$ is a corresponding port 50, 60 of the interconnect 20. Each port 50, 60 is coupled with the quality of service arbiter 70. The quality of service arbiter 70 is in turn coupled with the interconnect logic 80. The interconnect logic 80 is coupled directly with a slave 90 and via the memory controller 110 with an off-chip SDRAM 100. The path 85, coupling the interconnect logic 80 with the QoS arbiter 70 provides information to the QoS arbiter 70 on the current state or configuration of the interconnect logic 80. The path 115, coupling the memory controller 110 with the QoS arbiter 70 provides information to the QoS arbiter 70 on the current state or configuration of the memory controller 110.

In this example, the quality of service arbiter 70 is centralised and is particularly suited to arrangements where all the master units $M_1$, $M_2$ run on the same clock domain. All data transactions from the master units $M_1$, $M_2$ are first routed to this quality of service arbiter 70 which then forwards them in an appropriate order to the interconnect logic 80.

Each master unit $M_1$, $M_2$ specifies a quality of service requirement. Whilst in this example this quality of service requirement indicates the maximum latency period which is acceptable to that master from the time that a data transaction request is issued to the time that the data associated with that transaction is available, it will be appreciated that that the quality of service requirement could include other aspects of data processing apparatus performance, such as the provision of a channel of predetermined bandwidth (such as a minimum or maximum data bandwidth) between a given master unit and a given slave unit. Also, whilst in this example each master unit $M_1$, $M_2$ is provided with a corresponding constant predetermined quality of service requirement associated with that master unit, it will be appreciated that each data transaction itself could be provided with an indication of a quality of service requirement associated therewith.

Also, whilst individual master units are shown, it will be appreciated that each of these master units may not necessarily only represent a single physical master unit. Instead, one or more master units may be a virtual master. Each virtual master is a grouping of transactions which emanate from one physical master but can be identified as belonging to a distinct virtual grouping of transactions.

In this example, where the quality of service requirement is predetermined for each master, the requirements are stored within the quality of service arbiter 70. Typically, this stored configuration would be programmed by a controlling master during an initial setup or bootstrap phase before normal operation commences. During normal operation the requirements would be stored statically within the quality of service arbiter 70. In the case that data transactions themselves provide a quality of service requirement then these requirements must be provided dynamically from the master units to the quality of service arbiter 70 along with the transactions themselves. In the case of virtual masters the quality of service arbiter 70 can statically store quality of service requirements for multiple virtual masters corresponding to a single physical master.

Each data transaction provided by the master $M_1$ or the master $M_2$ is received at its associated port and forwarded onto the quality of service arbiter 70. The quality of service arbiter 70 will, as will be explained in more detail below, review the data transaction requests which have been received. The quality of service arbiter 70 will determine which slave unit that data transaction request is intended for. The quality of service arbiter 70 will review the current status of the interconnect logic 80 and will consider how the interconnect logic 80 is able to respond to the received request and any other pending requests in view of its current configuration. The quality of service arbiter 70 will also review the ability of the destination slave unit to respond to the data transaction. By reviewing both current status of the interconnect and its associated quality of service level, together with the ability of the destination slave unit to respond to the data transaction and its associated quality of service level, it becomes possible to judge the effect that a chosen transaction ordering has on the quality of service level that would be provided for the transactions by the combination of the interconnect logic and the slave units thereby enabling a judgement to be made of which transaction ordering would allow all stated quality of service requirements to be met.

In this example, the quality of service arbiter 70 will assume that only one data transaction can be supported by the interconnect logic 80 in any one cycle and that each data transaction, once issued to the interconnect logic 80, is transferred immediately to the destination slave unit (with no additional latency). However, it will be appreciated that the quality of service arbiter 70 could instead maintain an indication of the interconnectivity of the interconnect logic 80 and determine whether more than one transaction request may be transferred by the interconnect logic 80 in any one cycle. Furthermore, in some cases, it may be that the interconnect logic 80 may add a latency of one or more cycles for the data transaction to transfer across the interconnect logic 80.

The characteristics of the interconnect include such factors as whether it may issue only one or multiple data transaction in each cycle, or whether it may take one cycle or multiple cycles to transfer the data to a destination slave unit. The characteristics of the interconnect are dependant on the routing mechanisms employed by the interconnect and the routing topologies implemented between routing mechanisms. Combinatorial routing mechanisms that do not include storage or pipelining registers would enable data transfers to occur in a single cycle. Sequential routing mechanisms that include storage or pipelining registers may cause data transfers to take multiple cycles. Basic, linear routing topologies are likely to impose the limit that only one data transaction may be issued in a cycle. More complex, parallel routing topologies are likely to allow multiple data transactions to be issued in a given cycle.

Whilst in this example all points in the interconnect are synchronous and cycle timings are taken from a single reference clock for the entire interconnect, it will be appreciated that master units, slave units and points within the interconnect may have asynchronous timing relationships between them. In this case the quality of service requirements must be translated between different timing domains. This would cause time to be measured in different units since there may be no global concept of 'number of cycles' between elements with asynchronous timing relationships, as will be appreciated in the art.

The quality of service arbiter 70 maintains a record of outstanding transactions and their path through the interconnect logic 80. The interconnect logic 80 is interrogated by the quality of service arbiter 70 to determine the current state of any data transfers. The quality of service arbiter 70 utilises a set of dependency rules (not shown) which allow it to predict interconnect latency given the address range of the data transaction, the record of outstanding transactions, the current state of the interconnect and the predicted slave unit 90 or SDRAM 100 latency.

In this example, the slave unit 90 is assumed by the quality of service arbiter 70 to have a constant latency period for all data transactions. However, the SDRAM 100 is assumed to have a latency period which will vary dependent on the status of that SDRAM 100 and the address region used by a particular access. Accordingly, the memory controller 110 is provided which is interrogated by the quality of service arbiter 70 in order to determine the current state of the SDRAM 100 and the current configuration of the memory controller 110. The quality of service arbiter 70 maintains a model (not shown) of SDRAM behaviour which allows it to predict SDRAM 100 access latency given the record of outstanding transactions, and the configuration and current state of the memory controller 110.

Figure 2:
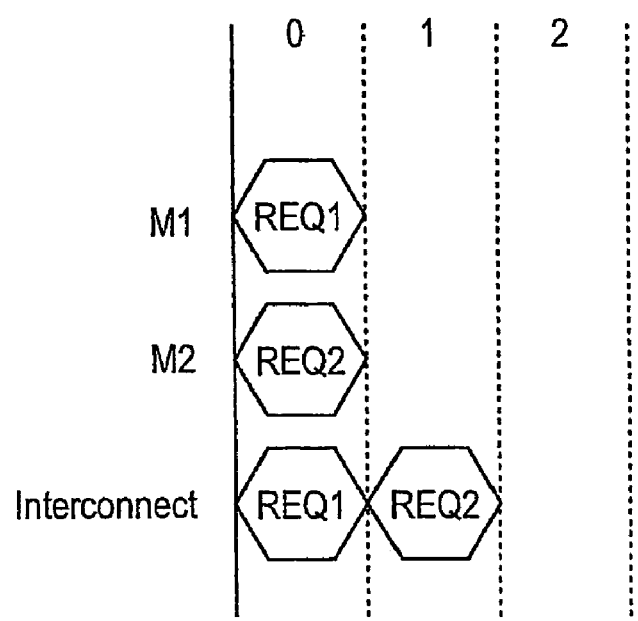
FIG. 2 is a timing diagram illustrating data transaction requests to be transmitted over the interconnect.

To illustrate the operation of interconnect 20 in more detail an example sequence of data transactions will now be described with reference to FIG. 2. As illustrated in FIG. 2, the master units $M_1$ and $M_2$ both initiate a data transaction request for the SDRAM 100. The quality of service arbiter 70 is provided with an indication that the maximum acceptable latency time for a data transaction initiated by the master $M_1$ is 10 cycles, whilst the maximum allowable latency for a data transaction is initiated by the master $M_2$ is 14 cycles.

The quality of service arbiter 70 is provided with an indication from the memory controller 110 that it is able to receive data transaction requests, that any data transaction requests falling within a first address range (i.e. falling within memory regions of the SDRAM 100 which are not currently active) will take 5 cycles to activate and then 8 cycles to access, and that any transaction requests within a second address range (i.e. falling within memory regions of the SDRAM 100 which are currently active) will take just 8 cycles to access since there is no need to issue a command to activate that address range.

Data transaction requests from master units $M_1$ and $M_2$ are received by the quality of service arbiter 70. The quality of service arbiter 70 decodes the addresses associated with the data transactions requests. The quality of service arbiter 70 determines from the addresses that both data transactions are intended for the SDRAM 100. The quality of service arbiter 70 determines that request 1 falls within the second address range and that request 2 falls within the first address range.

The quality of service arbiter 70 reviews the quality of service requirement for each master unit $M_1$ and $M_2$, and compares this with the availability of the interconnect logic 80 and the ability of the SDRAM 100 to respond to the transaction request. In this example, the interconnect logic 80 is assumed to be available and so will not add any additional latency. However, in this example, only one request may be sent over the interconnect logic 80 in any one cycle.

Hence, the quality of service arbiter 70 must choose when to issue request 1 and when to issue request 2 to the interconnect logic 80. In this example, the quality of service arbiter 70 has two possible options, as illustrated in FIGS. 3 and 4.

FIG. 3 illustrates the latency periods calculated by the quality of service arbiter 70 when issuing request 1 first and then request 2.

As interconnect logic 80 is available, request 1 can be issued in cycle 0 and will reach the memory controller 110 in cycle 0. Because request 1 is in the second address range the SDRAM 100 does not need to be prepared for access. Accordingly, the data associated with request 1 will take eight cycles to be accessed and the data will be available in cycle nine.

Meanwhile, commands associated with request 2 will be issued in cycle 1 and will be received by the memory controller 110 in cycle 1. Because request 2 is associated with the first address range the SDRAM 100 will need to be prepared for access to that address range. Accordingly, the memory controller 110 will issue an activate command to prepare the SDRAM 100 for accesses to addresses within the first address range. The activate command will take five cycles to complete and, thereafter, the memory controller 110 can issue an access command to the SDRAM 100. The access to the SDRAM 100 will take eight cycles to complete. The data associated with request 2 will therefore be available in cycles fifteen.

Hence, although the data transaction for master $M_1$ completes within nine cycles (which is less than its maximum allowable latency period of 10 cycles), the master unit $M_2$ completes its data access after 15 cycles, which violates its quality of service requirement.

Accordingly, the quality of service arbiter 70 will reorder the received requests. Whilst in this example, the two requests are swapped, with request 2 being issued before request 1, it will be appreciated that many more outstanding requests may need to be considered by the quality of services arbiter 70 which would require a decision to be made between a larger number of request ordering possibilities. The quality of service arbiter 70 must include sufficient resources to manage its function with the maximum number of outstanding requests that are likely to occur during the normal operation of the interconnect 20.

FIG. 4 illustrates the latency periods calculated by the quality of service arbiter 70 when issuing request 2 first and then request 1.

If request 2 is issued first by the quality of service arbiter 70, then it will reach the memory controller 110 in cycle 0. Because request 2 is associated with the first address range, the SDRAM 100 will take five cycles to activate and prepare for that access. Accordingly, an activate command for the first address range is issued. Thereafter, an access command for request 2 is issued and the data is available after eight cycles. Hence, the data associated with request 2 will be available in cycle 14.

Meanwhile, request 1 is issued after request 2 in cycle one. Because request 1 falls within the second address range that access takes eight cycles. Hence, the data associated with request 1 will be available after ten cycles.

Hence, with this alternate ordering, the data transaction associated with master unit $M_1$ is available within 10 cycles, whilst the data transaction associated with master unit $M_2$ is available within 14 cycles. Accordingly, the quality of service requirement for both master $M_1$ and master $M_2$ is satisfied and request 2 will be issued by the quality of service arbiter 70, followed by request 1.

Although the above example considers the ordering of data transaction relating to the same slave unit, the same technique can be used for data transactions to different slave units as will be described in more detail below with reference to FIGS. 5 and 6.

Considering now an alternate set of data transactions involving both the SDRAM 100 and the slave unit 90. In this example, master unit $M_2$ initiates a data transaction with the slave 90, whilst master unit $M_1$ initiates a data transaction with the SDRAM 100.

The quality of service arbiter 70 is provided with an indication that the maximum acceptable latency time for a data transaction initiated by the master $M_1$ is 10 cycles, whilst the maximum allowable latency for a data transaction initiated by the master $M_2$ is 14 cycles.

The quality of service arbiter 70 is also provided with an indication that every data transaction with the slave 90 takes thirteen cycles to complete. The memory controller 110 indicates to the quality of service arbiter 70 that, as described above, the first address range will take five cycles to prepare, whilst the second address range is available for access.

Also, in this example, the quality of service arbiter 70 is provided with an indication that the interconnect logic 80 is only able to support one data transfer in any one cycle.

The quality of service arbiter 70 receives request 1 from master $M_1$ to access an address in the second address range from the SDRAM 100. The quality of service arbiter 70 also receives request 2 from the master unit $M_2$ to access an address in the slave 90.

Once again, in this example, the quality of service arbiter 70 has two possible options for issuing the two requests to the interconnect logic 80.

Figure 5:
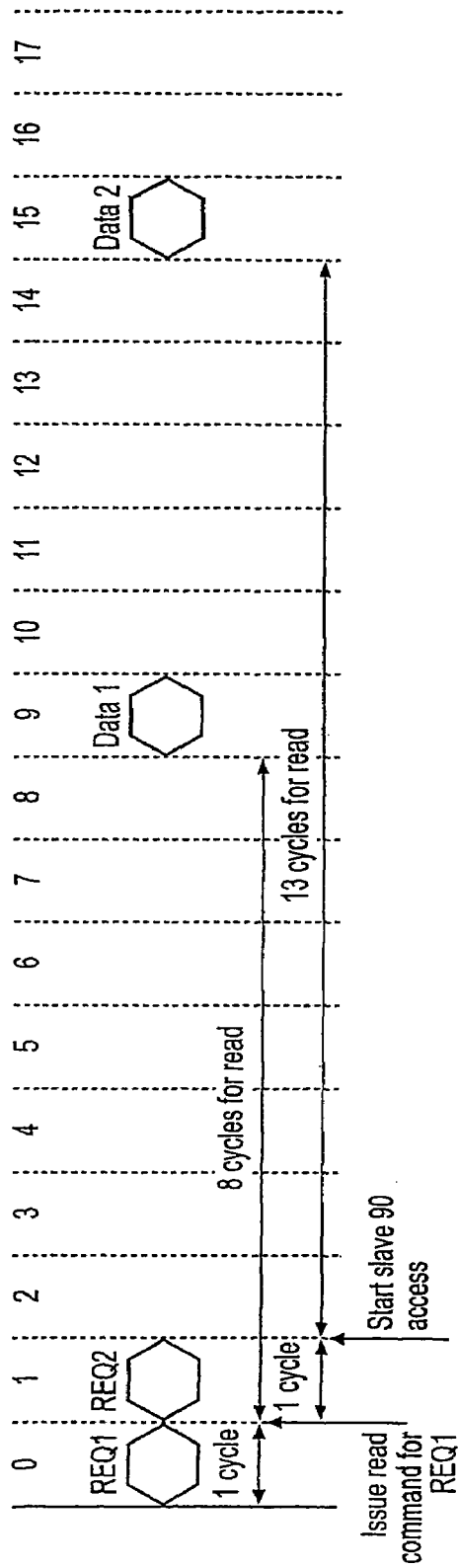
FIG. 5 is a timing diagram showing another ordering of the data transactions received.

Considering the first possibility, as illustrated in FIG. 5, if the quality of service arbiter 70 issues request 1 first then this is received by the memory controller 110 in cycle 0. Because the address falls within the second address range, the request takes a further eight cycles for the data associated with request 1 to be available. Hence, request 1 completes after nine cycles.

Meanwhile, request 2 will be issued after request 1 and this will take thirteen cycles for the access to the slave unit 90 to complete. Hence, the data associated with request 2 will be available after 15 cycles.

Accordingly, whilst the data requested by the master unit $M_1$ will be available within nine cycles, the data requested by the master unit $M_2$ will be available after 15 cycles which is longer than the quality of service requirement for that master unit.

Accordingly, the quality of service arbiter 70 will consider an alternate ordering of the received requests.

Figure 6:
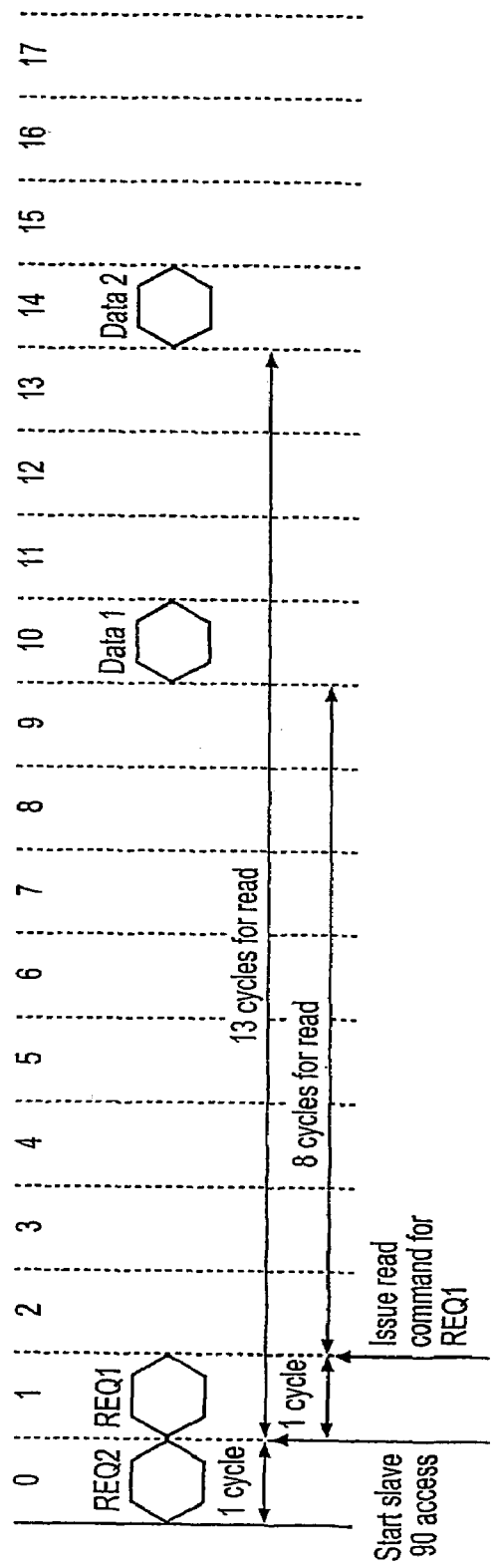
FIG. 6 is a timing diagram showing a further ordering of the transaction requests.

The quality of service arbiter 70 will consider the timing when request 2 is issued before request 1, as illustrated in FIG. 6. If request 2 is issued first then this will be received by the slave unit 90 in cycle 0. The slave unit 90 will take 13 cycles to perform the data access and the data associated with request 2 will be available after 14 cycles.

Meanwhile, request 1 will be issued in the cycle following request 2 and, because the address associated with request 1 falls within the second address range, the data associated with request 1 will be available after eight cycles. Hence, the data associated with request 1 will be available after ten cycles.

Accordingly, in this alternate ordering, the data transaction associated with the master unit $M_1$ will be available within ten cycles, whilst the data transaction associated with the memory unit $M_2$ will be available within 14 cycles. Hence, with this ordering, the quality of service requirement for both the master unit $M_1$ and the master unit $M_2$ will be achieved. Accordingly, request 2 is issued by the quality of service arbiter 70 prior to request 1.

Whilst in all the above examples simple swapping of the two data transactions is performed, it will be appreciated that where more than two data transactions are pending more complex rearrangements may take place. For example, the quality of service arbiter 70 may reorder the pending transactions to elevate the data transactions which fail to achieve the quality of service requirement by the greatest amount such that they are issued earlier. Also, when a certain transaction ordering already meets all quality of service requirements the quality of service arbiter 70 may choose to re-order transactions in order to improve system efficiency. One example of this would be to group together any data transactions issued by each master unit to an activated memory region since this will avoid the power overhead of having to close and then reactivate memory regions. In this scheme, however, priority would remain for reordering to meet quality of service requirements rather than reordering to meet any efficiency requirements.

Also, if master $M_1$ issues a long burst transaction and master $M_2$ issues a short burst transaction then it may prove difficult to meet a very short latency requirement for both accesses. In this instance the quality of service arbiter 70 may choose to split the long burst transaction from master $M_1$ into a series of two or more smaller transactions. This would then allow the quality of service arbiter 70 to schedule the transaction from master $M_2$ within the split up burst transactions from master $M_1$. This improved scheduling flexibility would increase the probability that the quality of service arbiter 70 would find an ordering to meet all quality of service requirements.

Whilst in the above examples the quality of service requirement indicates the maximum latency period for a transaction, it will be appreciated that the quality of service requirement could include a requirement for a predetermined bandwidth, such as a maximum or minimum data bandwidth, carried by transactions initiated by a particular master. Accordingly, the quality of service requirement may also relate a minimum data bandwidth which must be available for a particular master.

As previously explained, the quality of service arbiter 70 in FIG. 1 maintains a record of outstanding transactions and an indication of their path through the interconnect logic 80. The quality of service arbiter 70 also provides a mechanism which ensures that the opportunity is provided for each transactions to transfer a minimum quantity of data over a predetermined fixed period of time. Also, whilst a minimum data bandwidth requirement may cover all transactions for a particular master, it will be appreciated that a minimum data bandwidth requirement might only apply to transactions occurring between a particular master and a particular slave.

Accordingly, the interconnect logic 80 is interrogated by the quality of service arbiter 70 to determine the current state of any data transfers. The quality of service arbiter 70 also determines the scheduling of the transaction given the address range of the data transaction, the record of outstanding transactions, the progress over a certain fixed time period, the current state of the interconnect and the current state of the slave unit 90 or SDRAM 100.

In one arrangement, the quality of service arbiter 70 allocates time slots within a repeating time period for shared resources within which to schedule the transactions. This reserves any shared resource in the interconnect logic 80 or the shared slave unit 90 or the shared SDRAM 100 so that transactions can be scheduled to meet the data bandwidth requirement.

In another arrangement, the quality of service arbiter 70 tracks the quantity of data transferred by the master within a repeating time period. Transactions are then scheduled to distribute them within the repeating time period so that a required quantity of data is transferred in that period.

Whilst in the above examples, for a minimum data bandwidth requirement, the transactions are scheduled at calculated times within a repeating time period, it will be appreciated that scheduling can also occur by dynamically translating the minimum data bandwidth requirement into a minimum latency requirement for each transaction. This enables the use of mixed quality of service requirements specified in terms of latency for some masters and in terms of minimum bandwidth for other masters.

Whilst in all the above examples simple swapping of the two data transactions is performed, it will be appreciated that where more than two data transactions are pending more complex rearrangements may take place. For example, the quality of service arbiter 70 may reorder the pending transactions to elevate the data transactions which fail to achieve the quality of service requirement by the greatest amount such that they are issued earlier. Also, when a certain transaction ordering already meets all quality of service requirements the quality of service arbiter 70 may choose to re-order transactions to improve system efficiency. One example of this would be to group together any data transactions issued by each master unit to an activated memory region since this will avoid the power overhead of having to close and then reactivate memory regions. In this scheme, however, priority would remain for reordering to meet quality of service requirements rather than reordering to meet any efficiency requirements.

Also, if master $M_1$ issues a long burst transaction and master $M_2$ issues a short burst transaction then it may prove difficult to meet a very short latency requirement for both accesses. In this instance the quality of service arbiter 70 may choose to split the long burst transaction from master $M_1$ into a series of two or more smaller transactions. This would then allow the quality of service arbiter 70 to schedule the transaction from master $M_2$ within the split up burst transactions from master $M_1$. This improved scheduling flexibility would increase the probability that the quality of service arbiter 70 would find an ordering to meet all quality of service requirements.

Figure 7:
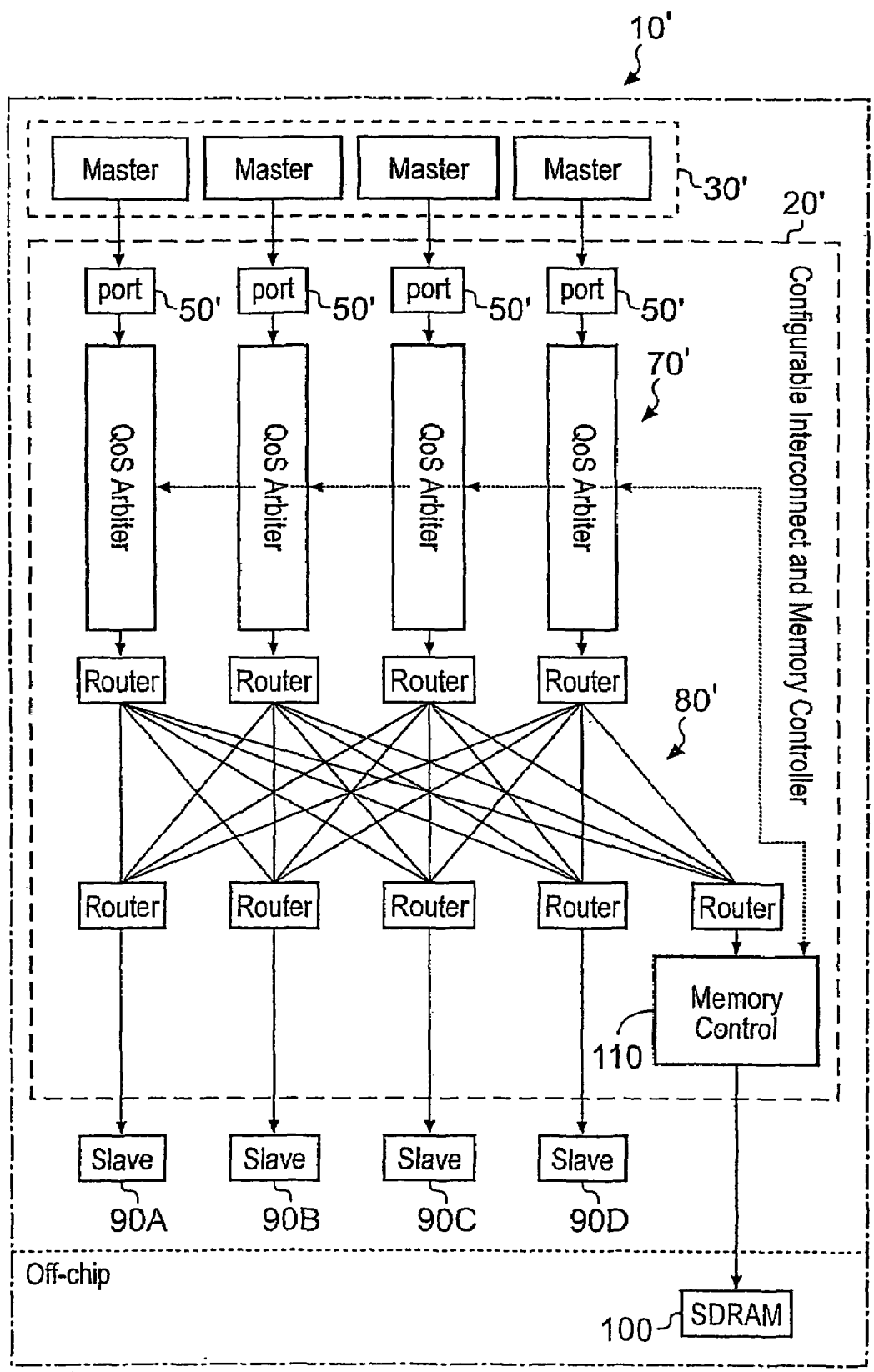
FIG. 7 illustrates a data processing system having an interconnect according to another embodiment of the present invention.

FIG. 7 illustrates a data processing apparatus, generally 10' having an interconnect 20' according to a second embodiment. In this example, four master units, generally 30', are provided, each coupled via a port 50' with a corresponding quality of service arbiter 70'.

The quality of service arbiters 70' are distributed, with one being dedicated for each master unit. In this example, the quality of service arbiters 70' can be physically adjacent to each master unit and the masters units may run at different clock frequencies.

The quality of service arbiters 70' communicate with each other, the interconnect 80' and with a memory controller 110. The memory controller 110 is coupled with a SDRAM 100. A plurality of slaves unit 90a-90n are provided. Each master unit 30' is operable to be connected with each slave unit 90a-90n or the memory controller 110 via an interconnect 80'.

Each quality of service arbiter receives data transactions from a corresponding master unit and determines quality of service levels supported by the destination slave unit for that data transaction, together with the quality of service level provided by the interconnect logic 80.

As with the arrangement shown in FIG. 1, the quality of service arbiters 70' are provided with an indication of the maximum acceptable latency time for a data transaction initiated by its associated the master unit. The quality of service arbiters 70' are also provided with an indication that every data transaction with the slave units 90a to 90n takes a predetermined number of cycles to complete. The memory controller 110 indicates to each quality of service arbiter 70' the current status and configuration of the SDRAM 100. This enables the quality of service arbiters 70' to predict the number of cycles taken to access the different address ranges in the SDRAM 100 depending on a chosen request ordering. The interconnect 80' indicates to each quality of service arbiter 70' the current status of the routers and any transactions pending within the interconnect. This enables the quality of service arbiters 70' to determine the capacity of the interconnect available to route transactions and their latency across the interconnect.

The quality of service arbiters 70' each maintain a copy of a transaction queue and each needs to understand which dependencies are relevant between pending data transactions in the queue (i.e. two master units may be able to issue a new transaction to the interconnect 20' at the same time but if they are directed at the same slave unit then the slave unit must receive one transaction before the other). Accordingly, the quality of service arbiters 70' are operable to communicate with each other to determine the correct ordering within the queue of the pending requests yet to be issued which enable the quality of service requirements of each master unit to be met.

It will be appreciated that the quality of service arbiter 70 or 70' will typically take advantage of the particular performance characteristics of the SDRAM 100 by grouping together any data transactions issued by each master unit to an activated memory region of the SDRAM 100 such that maximum performance or utilisation of the SDRAM 100 can be achieved.

Furthermore, by introducing quality of service constraints on data transactions being transmitted between master units and slave units, it is possible to route other, non-essential, data via the interconnect 20 or 20' without impacting on the overall performance of the data processing apparatus 10 or 10'. For example, it would be possible to associate data transactions directly associated with the operational performance of the data processing apparatus with a high quality of service (low latency) requirement, whilst ancillary data transactions (such as those associated with trace or debug) can be associated with a lower quality of service (higher latency). In this way the need to provide separate resources to transmit non-essential data can be obviated. Accordingly, it is possible to ensure that the transmission of any non-essential data does not impact on the quality of service of other data such that the normal behaviour of the data processing system can be guaranteed not to be disturbed.

For any interconnect arrangement, it will be appreciated that it is possible to statically or dynamically evaluate the performance of the interconnect 20 or 20' to ensure that it is possible to meet all quality of service requirements within the physical constraints of the interconnect architecture and the capabilities of the master units and slave units.

Figure 8:
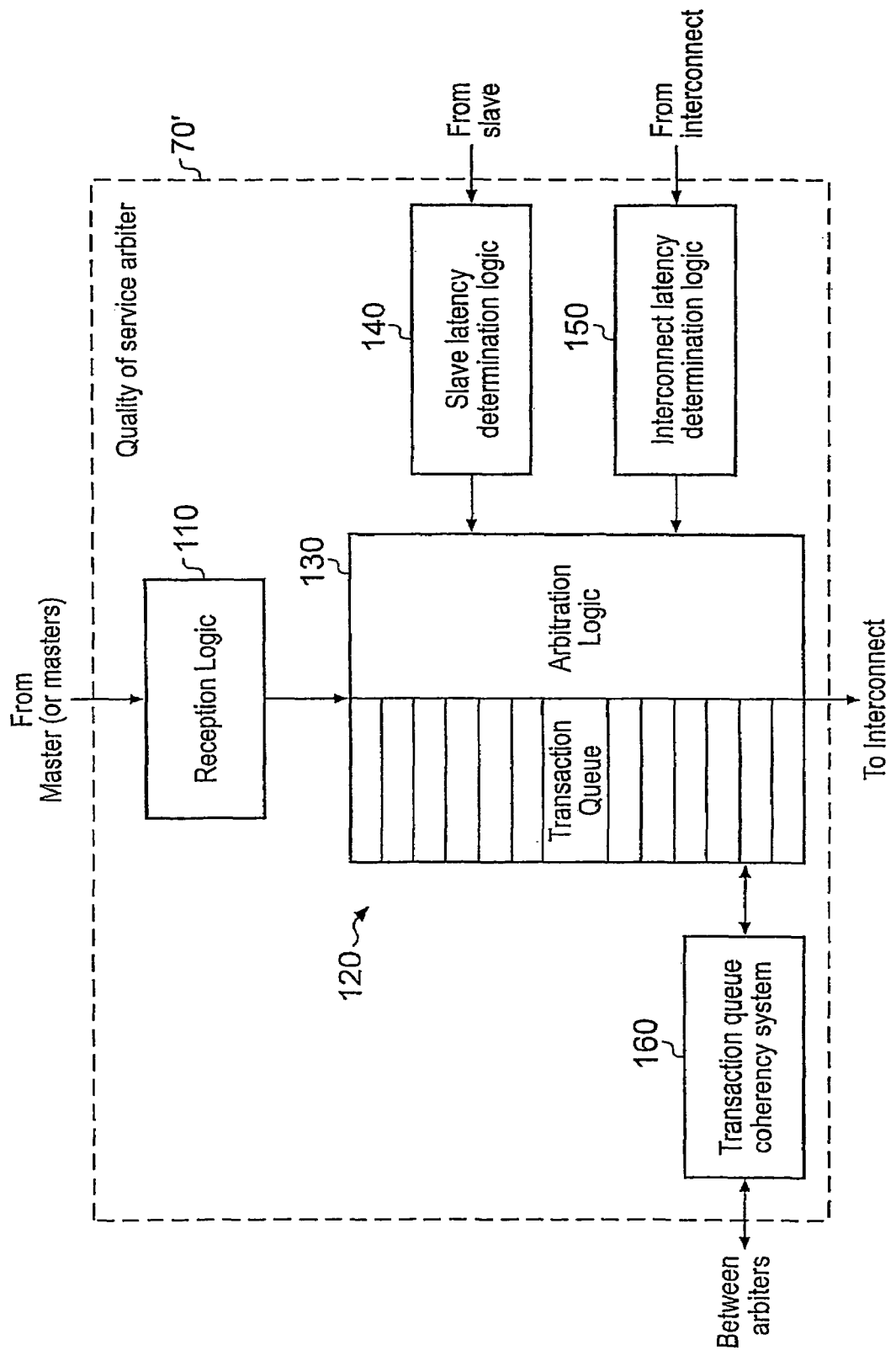
FIG. 8 illustrates in more detail the arrangement of an example quality of service arbiter.

FIG. 8 illustrates in more detail the arrangement of an example quality of service arbiter 70'.

Each data transaction is received by reception logic 110. The reception logic 110 places the data transaction in a transaction queue 120. Associated with each data transaction is a quality of service requirement. The transaction queue 120 provides an indication of all the pending data transactions yet to be issued by all the quality of service arbiters 70' to the interconnect logic and their associated quality of service requirements. The status of the transaction queue 120 is updated in communication with every other quality of service arbiter 70' via a transaction queue coherency system 160.

Slave latency determination logic 140 provides an indication of the latency associated with each slave unit which enables the latency of a slave unit to be determined for any particular transaction. Similarly, interconnect latency determination logic 150 provides an indication of the latency associated with the interconnect logic for any particular transaction.

Arbitration logic 130 reviews the transactions within the transaction queue 120 and determines with reference to the slave latency determination logic 140 and the interconnect latency determination logic 150 an appropriate ordering of the transaction queue 120 which achieves each quality of service requirement. The transaction queue coherency system 160 communicates the ordering with other quality of service arbiters 70' to ensure that each maintains an identical transaction queue 120. Typically, however, each individual arbiter 70' will only cause transactions associated with the master coupled with that arbiter 70' to be promoted or demoted.

Whilst the examples above shown assume that the quality of service arbiter 70, 70' is operable to determine the quality of service levels associated with each outstanding data transaction and determine a correct ordering within a single cycle, it will be appreciated that in more complex arrangements, this determination may take additional cycles but that this additional time taken may be readily built into the determination.

Although illustrative embodiments of the invention have been described in detail herein, with reference to the accompanying drawings, it is understood the invention is not limited to those precise embodiments, and that various changes and modifications can be effected therein by one skilled in the art without departing from the scope of the invention as defined by the appended claims.

The invention claimed is:

1. A method of ordering data transactions between a plurality of master units and a plurality of slave units using interconnect logic which couples a master logic unit with a slave logic unit to enable each data transaction to occur, said method comprising the steps of:
    a) receiving a request to perform a data transaction between a master unit and a slave unit,
    b) receiving an indication of a quality of service requirement associated with said data transaction;
    c) determining an interconnect quality of service level achievable when transmitting said data transaction over the interconnect logic having regard to any other pending data transactions which are yet to be issued;
    d) determining a slave quality of service level achievable when responding to said data transaction once received by said slave unit from said interconnect logic; and
    e) combining said interconnect quality of service level and said slave quality of service level and determining whether the combined interconnect quality of service level and the slave quality of service level fails to achieve the quality of service requirement and, if said combined interconnect quality of service level and said slave quality of service level fails to achieve said quality of service requirement, reordering the pending data transactions to enable the quality of service requirement of each data transaction to be achieved.

2. The method of claim 1, wherein at least one of said plurality of slave units has a constant predetermined slave quality of service level for all data transactions associated with that slave unit.

3. The method of claim 1, wherein at least one of said plurality of slave units has a predetermined slave quality of service level which differs for different data transactions associated with that slave unit.

4. The method of claim 1, wherein said interconnect quality of service level is determined in dependence on the utilisation of said interconnect logic.

5. The method of claim 1, wherein said interconnect quality of service level is determined in dependence on a status or configuration of the interconnect resources.

6. The method of claim 1, wherein said slave quality of service level is determined in dependence on a status or configuration of that slave unit.

7. The method of claim 1, wherein said slave quality of service level is determined having regard to any other pending data transactions which are yet to be issued.

8. The method of claim 1, wherein said step of reordering comprises elevating the data transaction which fails to meet its quality of service requirement by the greatest amount to an earlier position in said pending data transactions.

9. The method of claim 1, wherein said indication of a quality of service requirement associated with said data transaction is provided with said data transaction.

10. The method of claim 1, wherein said indication of a quality of service requirement associated with said data transaction is determined based on a predetermined quality of service requirement of the master unit which initiated said data transaction.

11. The method of claim 1, wherein said indication of a quality of service requirement comprises an indication of a transaction latency period within which said data transaction is to complete, said interconnect quality of service level comprises an interconnect latency period incurred when transmitting said data transaction over the interconnect logic having regard to any other pending data transactions which are yet to be issued, said slave quality of service level comprises a slave latency period incurred when responding to said data transaction once received by said slave unit from said interconnect logic; and said step (e) comprises determining whether said combined interconnect quality of service level and said slave quality of service level exceeds the transaction latency period and, if so, reordering the pending data transactions to enable the combined interconnect latency period of each data transaction to be achieved.

12. The method of claim 11, wherein at least one of said plurality of slave units has a constant predetermined slave latency period for all data transactions associated with that slave unit.

13. The method of claim 11, wherein at least one of said plurality of slave units has a predetermined slave latency period which differs for different data transactions associated with that slave unit.

14. The method of claim 11, wherein at least one of said plurality of slave units has a first predetermined slave latency period for data transactions associated with that slave unit falling within a set of first address ranges and a second predetermined slave latency period for all other data transactions associated with that slave unit.

15. The method of claim 11, wherein at least one of said plurality of slave units comprises a SDRAM having a first predetermined slave latency period for data transactions associated with active memory regions of said SDRAM and a second predetermined slave latency period for data transactions associated with inactive memory regions of said SDRAM.

16. The method of claim 15, wherein the step of reordering comprises grouping together any of said pending data transactions associated with active memory regions.

17. The method of claim 11, wherein said interconnect logic is operable to support a predetermined number of data transactions at any one time.

18. The method of claim 11, wherein said interconnect latency period is determined in dependence on the number of outstanding data transactions and the number of data transaction supported by said interconnect logic at any one time.

19. The method of claim 11, wherein said step of reordering comprises elevating the data transaction which fails to meet its transaction latency period by the greatest amount to an earlier position in said pending data transactions.

20. The method of claim 1, wherein said indication of a quality of service requirement comprises an indication of a bandwidth required to support that transaction, said interconnect quality of service level comprises an interconnect bandwidth utilised when transmitting said data transaction over the interconnect logic having regard to any other pending data transactions which are yet to be issued, said slave quality of service level comprises a slave bandwidth utilised when responding to said data transaction once received by said slave unit from said interconnect logic; and said step (e) comprises determining whether either the interconnect bandwidth or the slave bandwidth fails to support said bandwidth required, if so, reordering the pending data transactions to support said bandwidth required.

21. The method claim 20, wherein said indication of a quality of service requirement comprises an indication of a minimum bandwidth required to support that transaction, said interconnect quality of service level comprises an interconnect bandwidth utilised when transmitting said data transaction over the interconnect logic having regard to any other pending data transactions which are yet to be issued, said slave quality of service level comprises a slave bandwidth utilised when responding to said data transaction once received by said slave unit from said interconnect logic; and said step (e) comprises determining whether either the interconnect bandwidth or slave bandwidth fails to achieve said minimum bandwidth required, if so, reordering the pending data transactions to support said minimum bandwidth required.

22. The method of claim 1, further comprising the step of:
f) in the event the reordered pending data transactions achieve the quality of service requirement, reordering the pending data transactions to improve transaction efficiency.

23. The method of claim 1, wherein said step of reordering comprises splitting at least one pending data transaction into a plurality of sub-transactions and reordering said pending data transactions and sub-transactions to meet the quality of service requirements.

24. An interconnect operable to couple a plurality of master logic units with a plurality of slave logic units to enable data transactions between a master logic unit and a slave logic unit to occur, said interconnect comprising:
reception logic configured to receive a request to perform a data transaction between a master unit and a slave unit, each request having an indication of a quality of service requirement associated with said data transaction;
interconnect quality of service determination logic configured to determine an interconnect quality of service level achievable when transmitting said data transaction over the interconnect logic having regard to any other pending data transactions which are yet to be issued;
slave quality of service determination logic configured to determine a slave quality of service level achievable when responding to said data transaction once received by said slave unit from said interconnect logic; and
arbitration logic configured to combine said interconnect quality of service level and said slave quality of service level and to determine whether the combined interconnect quality of service level and the slave quality of service level fails to achieve the quality of service requirement and, if said combined interconnect quality of service level and said slave quality of service level fails to achieve said quality of service requirement, to reorder the pending data transactions to enable the quality of service requirement of each data transaction to be achieved.

25. The interconnect of claim 24, wherein at least one of said plurality of slave units has a constant predetermined slave quality of service level for all data transactions associated with that slave unit.

26. The interconnect of claim 24, wherein at least one of said plurality of slave units has a predetermined slave quality of service level which differs for different data transactions associated with that slave unit.

27. The interconnect of claim 24, wherein said interconnect quality of service level is determined in dependence on the utilisation of interconnect logic.

28. The interconnect of claim 24, wherein said interconnect quality of service level is determined in dependence on a status or configuration of the interconnect resources.

29. The interconnect of claim 24, wherein said slave quality of service level is determined in dependence on a status or configuration of that slave unit.

30. The interconnect of claim 24, wherein said slave quality of service level is determined having regard to any other pending data transactions which are yet to be issued.

31. The interconnect of claim 24, wherein said arbitration logic is operable to elevate the data transaction which fails to meet its quality of service requirement by the greatest amount to an earlier position in said pending data transactions.

32. The interconnect of claim 24, wherein said indication of a quality of service requirement associated with said data transaction is provided with said data transaction.

33. The interconnect of claim 24, wherein said indication of a quality of service requirement associated with said data transaction is determined based on a predetermined quality of service requirement of the master unit which initiated said data transaction.

34. The interconnect of claim 24, wherein said indication of a quality of service requirement comprises a indication of a transaction latency period within which said data transaction is to complete, said interconnect quality of service level comprises an interconnect latency period incurred when transmitting said data transaction over interconnect logic having regard to any other pending data transactions which are yet to be issued, said slave quality of service level comprises a slave latency period incurred when responding to said data transaction once received by said slave unit from said interconnect logic and said arbitration logic is operable to determine whether said combined interconnect quality of service level and said slave quality of service level exceeds the transaction latency period and, if so, to reorder the pending data transactions to enable the combined interconnect latency period of each data transaction to be achieved.

35. The interconnect of claim 34, wherein at least one of said plurality of slave units has a constant predetermined slave latency period for all data transactions associated with that slave unit.

36. The interconnect of claim 34, wherein at least one of said plurality of slave units has a predetermined slave latency period which differs for data transactions associated with that slave unit.

37. The interconnect of claim 34, wherein at least one of said plurality of slave units has a first predetermined slave latency period for data transactions associated with that slave unit falling within a set of first address ranges and a second predetermined slave latency period for all other data transactions associated with that slave unit.

38. The interconnect of claim 34, wherein at least one of said plurality of slave units comprises a SDRAM having a first predetermined slave latency period for data transactions associated with active memory regions of said SDRAM and a second predetermined slave latency period for data transactions associated with inactive memory regions of said SDRAM.

39. The interconnect of claim 38, wherein said arbitration logic is further operable to group together any of said pending data transactions associated with active memory regions.

40. The interconnect of claim 34, wherein said interconnect logic is operable to support a predetermined number of data transactions at any one time.

41. The interconnect of claim 34, wherein said interconnect latency period is determined in dependence on the number of outstanding data transactions and the number of data transaction supported by said interconnect logic at any one time.

42. The interconnect of claim 34, wherein said arbitration logic is further operable to elevate the data transaction which fails to meet its transaction latency period by the greatest amount to an earlier position in said pending data transactions.

43. The interconnect of claim 34, wherein said indication of a quality of service requirement comprises an indication of a bandwidth required to support that transaction, said interconnect quality of service level comprises an interconnect bandwidth utilised when transmitting said data transaction over the interconnect logic having regard to any other pending data transactions which are yet to be issued, said slave quality of service level comprises a slave bandwidth utilised when responding to said data transaction once received by said slave unit from said interconnect logic and said arbitration logic is operable to determine whether either the interconnect bandwidth or the slave bandwidth fails to support said bandwidth required, if so, to reorder the pending data transactions to support said bandwidth required.

44. The interconnect of claim 43, wherein said indication of a quality of service requirement comprises an indication of a minimum bandwidth required to support that transaction, said interconnect quality of service level comprises an interconnect bandwidth utilised when transmitting said data transaction over the interconnect logic having regard to any other pending data transactions which are yet to be issued, said slave quality of service level comprises a slave bandwidth utilised when responding to said data transaction once received by said slave unit from said interconnect logic and said arbitration logic is operable to determine whether either the interconnect bandwidth or slave bandwidth fails to achieve said minimum bandwidth required, if so, to reorder the pending data transactions to support said minimum bandwidth required.

45. The interconnect of claim 34, wherein said arbitration logic is further operable in the event the reordered pending data transactions achieve the quality of service requirement to reorder the pending data transactions to improve transaction efficiency.

46. The interconnect of claim 34, wherein said arbitration logic is operable to split at least one pending data transaction into a plurality of sub-transactions and to reorder said pending data transactions and sub-transactions to meet the quality of service requirements.

47. A system for processing data, comprising:
a plurality of master units;
a plurality of slave units; and
interconnect means for coupling said plurality of master logic units with said plurality of slave logic units to enable data transactions between a master logic unit and a slave logic unit to occur, said interconnect comprising:
reception means for receiving a request to perform a data transaction between a master unit and a slave unit, each request having an indication of a quality of service requirement associated with said data transaction;
interconnect quality of service determination means for determining an interconnect quality of service level achievable when transmitting said data transaction over the interconnect logic having regard to any other pending data transactions which are yet to be issued;
slave quality of service determination means for determining a slave quality of service level achievable when responding to said data transaction once received by said slave unit from said interconnect logic; and
arbitration means for combining said interconnect quality of service level and said slave quality of service level and for determining whether the combined interconnect quality of service level and the slave quality of service level fails to achieve the quality of service requirement and, if said combined interconnect quality of service level and said slave quality of service level fails to achieve said quality of service requirement, for reordering the pending data transactions to enable the quality of service requirement of each data transaction to be achieved.

* * * * *